United States Patent [19]

Peterson et al.

[11] Patent Number: 5,269,019
[45] Date of Patent: Dec. 7, 1993

[54] NON-VOLATILE MEMORY STORAGE AND BILEVEL INDEX STRUCTURE FOR FAST RETRIEVAL OF MODIFIED RECORDS OF A DISK TRACK

[75] Inventors: Gregory W. Peterson, Lyons; Leonard J. Kurzawa, Broomfield, both of Colo.

[73] Assignee: Storage Technology Corporation, Louisville, Colo.

[21] Appl. No.: 681,753

[22] Filed: Apr. 8, 1991

[51] Int. Cl.$^5$ .................. G06F 15/40; G06F 7/14; G06F 7/20; G06F 7/22

[52] U.S. Cl. .................. 395/600; 364/DIG. 1; 364/282.1; 364/256.4; 364/255.1; 364/246.4; 364/246; 364/243; 364/222.81; 395/275; 395/425

[58] Field of Search ............... 364/200; 395/600, 275, 395/425

[56] References Cited

U.S. PATENT DOCUMENTS

| | | | |
|---|---|---|---|
| 3,900,834 | 8/1975 | Casey et al. | 340/172.5 |
| 4,028,684 | 6/1977 | Divine et al. | 395/425 |
| 4,200,930 | 4/1980 | Rawlings et al. | 364/200 |
| 4,435,762 | 3/1984 | Milligan et al. | 364/200 |
| 4,456,971 | 6/1984 | Fukuda et al. | 395/500 |
| 4,467,421 | 8/1984 | White | 364/200 |
| 4,536,837 | 8/1985 | Olson et al. | 364/200 |
| 4,607,332 | 8/1986 | Goldberg | 395/575 |
| 4,695,949 | 9/1987 | Thatte et al. | 364/200 |
| 4,769,767 | 9/1988 | Hilbrink | 395/375 |
| 4,791,564 | 12/1988 | Takai | 395/425 |
| 4,989,134 | 1/1991 | Shaw | 364/200 |
| 5,043,871 | 8/1991 | Nishigaki et al. | 395/600 |
| 5,062,042 | 10/1991 | Binkley et al. | 395/600 |
| 5,091,901 | 2/1992 | Kishiro et al. | 371/40.1 |
| 5,136,692 | 8/1992 | Barrett et al. | 395/250 |
| 5,163,148 | 11/1992 | Walls | 395/600 |
| 5,201,044 | 4/1993 | Frey, Jr. et al. | 395/575 |
| 5,214,695 | 5/1993 | Arnold et al. | 380/4 |

OTHER PUBLICATIONS

IBM Technical Disclosure Bulletin, vol. 32, No. 11, Apr. 90, pp. 81-90 "Preventing overflow in a wrap-around buffer".
IBM Technical Disclosure Bulletin, vol. 34 No. 2, Jul. 1990, pp. 26-31 "Record caching scatter index table directory structure".
IBM Technical Disclosure Bulletin, vol. 33, No. 2, Jul. 1990 pp. 301-302 "No modified data indicator for caching subsystem".
Boling, "Speed up hard disks with DCACHE", PC Magazine vol. 7 No. 17, Oct. 1988 pp. 255-260.
Takisawa et al, "F1700 File controller unit", Fujitsu-Scientific and Technical Journal, vol. 26, No. 4, Feb. 1991 pp. 271-279.
Menon et al, "The IBM 3990 Disk Cache", Digest of Papers of the Compcon Spring 1988, pp. 146-151, IEEE New York.

*Primary Examiner*—Thomas C. Lee
*Assistant Examiner*—Wayne Amsbury
*Attorney, Agent, or Firm*—Duft, Graziano & Forest

[57] ABSTRACT

A method is described for managing data records stored in non-volatile memory in a disk drive system with cache memory. A variable-length directory containing descriptors of disk records is used to locate a selected record non-volatile memory. A table, ordered sequentially by record number, is used to quickly locate a record in non-volatile memory without having to perform a time-consuming search. In order to efficiently utilize space in non-volatile memory, a list is kept of free space for storing record descriptors. After an initial nominal allocation, additional free space is allocated only when required, thus further increasing the efficiency of use of non-volatile memory.

7 Claims, 4 Drawing Sheets

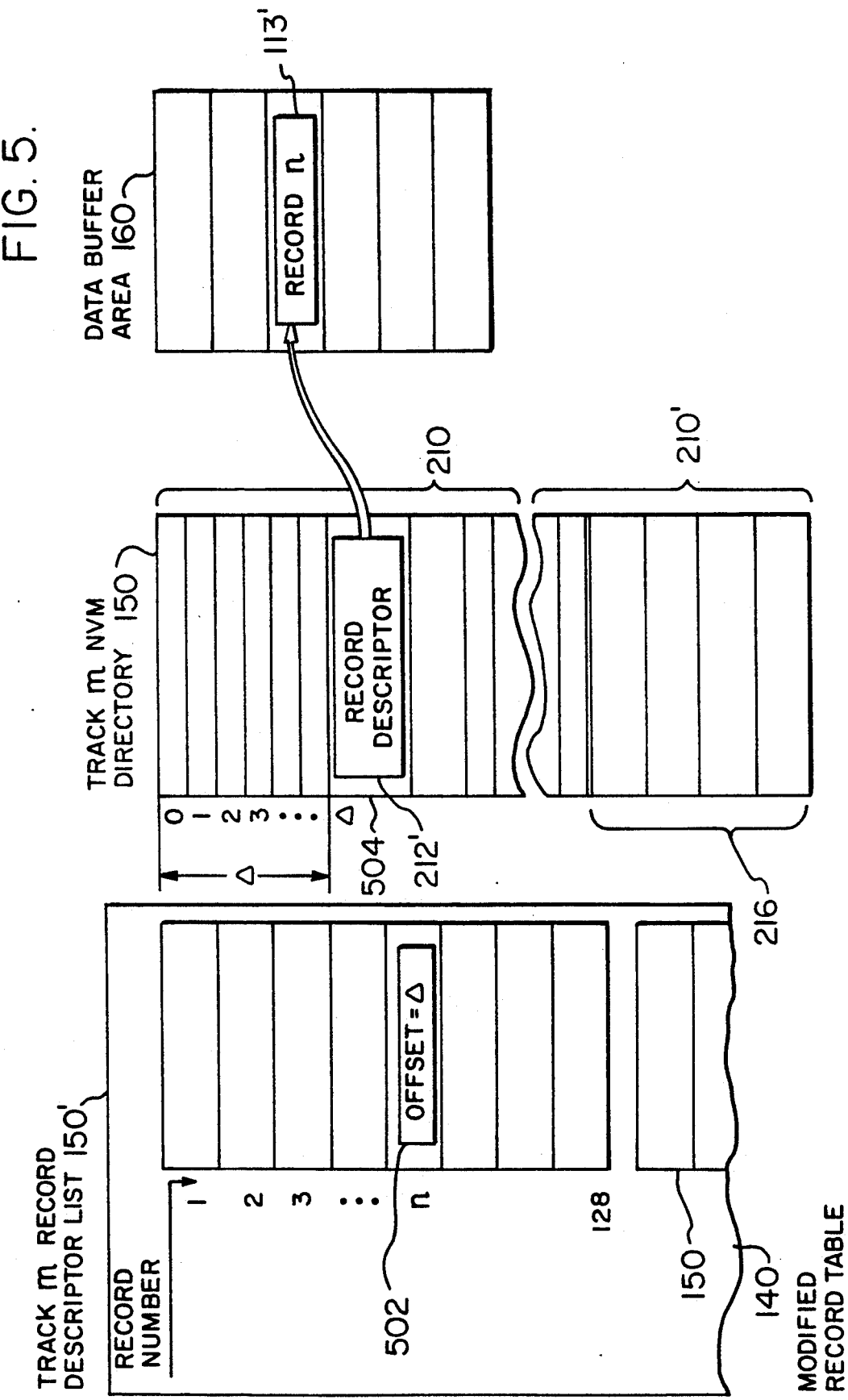

NON-VOLATILE MEMORY STORAGE AND BILEVEL INDEX STRUCTURE FOR FAST RETRIEVAL OF MODIFIED RECORDS OF A DISK TRACK

FIELD OF THE INVENTION

This invention relates generally to computer disk drive systems with associated cache memory and non-volatile memory subsystems, and more particularly, to a method for efficiently managing write operations to disk, in a disk drive system in which updated track images are kept both in volatile cache memory and in non-volatile cache memory.

PROBLEM

Many disk drive systems have associated cache memory to increase the speed with which data stored in the disk system can be accessed. Generally, cache memory is volatile; that is, any data stored in cache is lost if a power failure occurs. Data which has been modified or updated by a computer system is vulnerable to such a loss of power between the time the data is written to cache memory and the time it is written back to the disk drive system. In order to ensure the integrity of this updated data that has been written to cache memory, a copy of each disk record that has been updated is also written to non-volatile cache memory (NVM), so that it will remain intact in the event of a power failure.

Each track image staged to cache memory is fully represented in cache memory with all records on the track being stored in cache memory sequentially, by record number. However, the only records which must be copied into NVM are those records which have been modified (as the result of a write operation) after the track was staged from disk into cache memory. Once a track has been staged in cache memory, records contained in the track may be randomly written to, or modified by, a computer system. This means that NVM will generally contain a variable number of out-of-sequence records. This situation makes NVM difficult to manage in a manner which is efficient and which requires a minimum amount of system time and overhead.

SOLUTION

The present invention employs a novel method for managing records stored in non-volatile memory. As in the prior art, a directory containing record descriptors (pointers to NVM records) is used to locate a selected record in NVM. However, the method of the present invention uses a variable-length directory to save space in NVM. This reduces the cost of the disk drive system because non-volatile memory is relatively more costly than volatile types of memory. In addition, the prior art required searching through the directory of randomly-ordered descriptors in order to locate a given record in NVM. In contrast, the present invention uses a table of ordered directory entries to quickly locate a desired record, without having to perform a time-consuming search. The table is ordered sequentially by record number, and each entry therein contains the position, in the directory, of the record descriptor corresponding to a given record number. Thus, for example, record number n in NVM can be quickly located in two steps. First, the nth entry in the table is directly addressed. This entry indicates the location of the record descriptor for record number n, which descriptor is then directly addressed. The descriptor contains the address of record n, which has now been found without conducting a sequential search of the record descriptor directory.

Furthermore, since records in NVM are generally re-written back to disk in record number order, the sequentially ordered table provides for an effective method of performing this re-write operation.

In order to efficiently utilize the NVM space, a "free list" of available ("free") space for storing record descriptors is also kept in NVM. After an initial nominal allocation, additional free space is allocated only when required, thus further efficiently using non-volatile memory.

BRIEF DESCRIPTION OF THE DRAWING

FIG. 5 shows a record descriptor list in the modified record table, an associated non-volatile memory directory, and the data buffer area.

DETAILED DESCRIPTION

Figure 1:
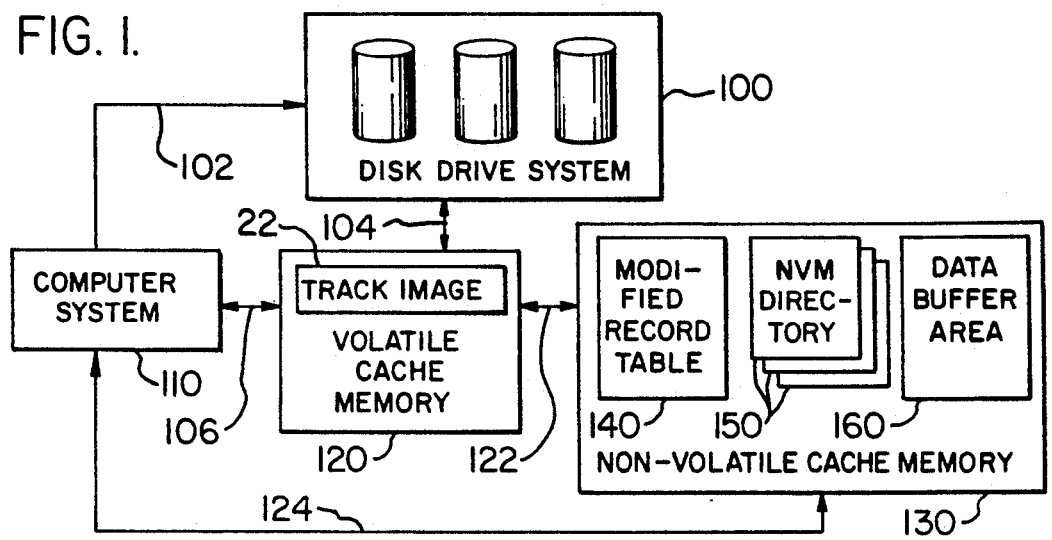
FIG. 1 shows, in block diagram form, the interrelationship between the disk drive system, an associated volatile cache memory subsystem, a track image read from the disk drive system into the volatile cache memory subsystem, the non-volatile cache memory subsystem, and a computer system.

FIG. 1 shows, in block diagram form, the interrelationship between the disk drive system 100, an associated cache memory subsystem 120, a track image 22 read from the disk drive system 100 into the volatile cache memory subsystem 120, a non-volatile cache memory subsystem 130, and a computer system 110. Note that the non-volatile memory subsystem 130 contains a modified record table 140, a plurality of non-volatile directories 150, and a data buffer area 160, the contents of which are described below.

Whenever the computer system 110 requests that data be written to or read from the disk drive system 100, the computer system 110 transmits information over line 102 identifying the location of the desired data within the disk drive system 100, usually specifying drive number (if the disk drive system 100 has more than one drive), cylinder, track, and record number. Upon issuance of a request by the computer system 110 to read a record from the disk drive system 100, an image 22 of the track containing the requested record is staged (read) from the disk drive system 100 over bus 104 into the volatile cache memory subsystem 120. The computer system 110 can then access the retrieved record in the cache memory subsystem 120 over bus 106.

After a track image has been read into cache memory 120, as records are updated, or modified, by computer system 110, space in a non-volatile memory data buffer 160 is allocated for a copy of these updated records.

The computer system 110 stores an updated copy of the requested record in the cache memory subsystem 120 over bus 122, and also stores, over bus 124, for the purpose of data integrity, a copy of the modified record or changes thereto in the non-volatile memory data buffer 160. Therefore, the record changes are safeguarded in the event of a power failure between the time the record has been modified by the computer system 110 and the time the record is written from the cache memory subsystem 120 back to the disk drive system 100. A segment 210 of non-volatile memory 130 is also allocated for managing and organizing the record with respect to other records located on the same track image 22.

When a write operation requested by the computer system 110 is complete, with the modified record having been successfully written from the cache memory subsystem 120 back to the disk drive system 100, all space used in non-volatile memory 130 for storage and management of the track associated with the record is deallocated.

If the write operation was unsuccessful because of a data integrity problem, the track image 22 is restaged into volatile cache memory 120 and a copy of the modified record in non-volatile memory 130 is written to the cache memory subsystem 120, and the write to disk operation is attempted again.

Non-Volatile Memory Architecture

Figure 2:
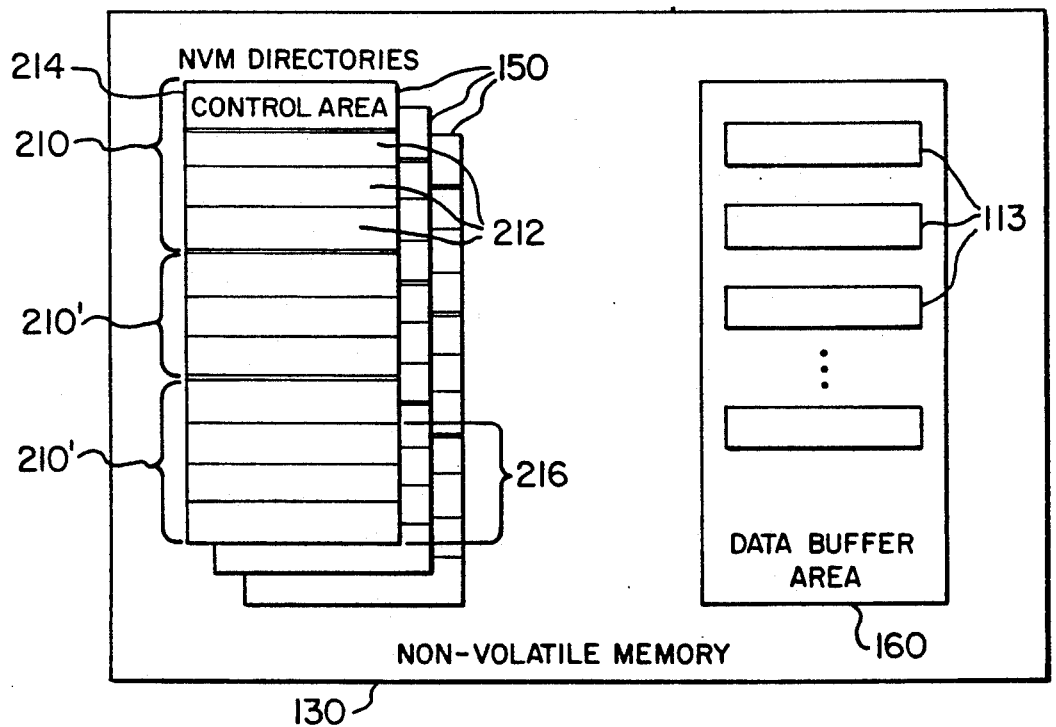
FIG. 2 shows the non-volatile memory subsystem containing a plurality of non-volatile memory directories, each containing a plurality of segments for storing record descriptors; and a data buffer area containing a plurality of records that have been modified by the computer system.

FIG. 2 shows the non-volatile memory subsystem 130 containing a plurality of non-volatile memory directories 150, each containing a plurality of segments 210, 210' for storing record descriptors 212; and a data buffer area 160 containing a plurality of updated records 113 read from the computer system 110. After a track image 22 has been read from the disk drive system 100 into the cache memory subsystem 120, when a record on the track is updated by the computer system 110, a segment 210 of non-volatile memory 130 is initially allocated as an area for storing a plurality of record descriptors 212, each of which contains information pertaining to records in the track image 22. More specifically, each record descriptor 212 references a modified disk record 113 that has been written to the data buffer area 160 in non-volatile memory 130. A record descriptor 212 includes: (1) a flag(s) field indicating whether the associated record has been modified, (2) a pointer to a copy of the record in non-volatile memory, and (3) a "count key data field", containing the cylinder and track number of the record in the disk drive system 100, a record identification number, and the length of the record.

The non-volatile memory segment 210 contains a control area 214 and space for 24 record descriptors 212, with subsequent segments 210' being allocated as necessary, each segment having sufficient space to store 32 record descriptors, because the subsequent segments do not require additional control areas. A control area 214 contains data used to manage an area of memory, and is a concept well-known in the art. Every allocated segment 210 or 210' is the same size. Typically, the 24 record descriptors 212 in the initial segment 210 are sufficient for a given track, but an exceptional track may require up to five segments 210,210' to be allocated. It should be noted that more or less space could be allocated for a segment 210,210', depending on the specific characteristics of the disk drive system 100 and the program being run on the computer system 110. Only the required number of segments 210,210' are allocated for a given track.

All segments 210 and 210' for a given track are located in a variable size directory 150, in non-volatile memory 130, containing pointers to records which have been modified. This modified data record directory is referred to as a non-volatile memory directory 150. When the computer system 110 requests that a record be updated, a non-volatile memory directory 150 is allocated for that track.

Modified Record Table

Figure 3:
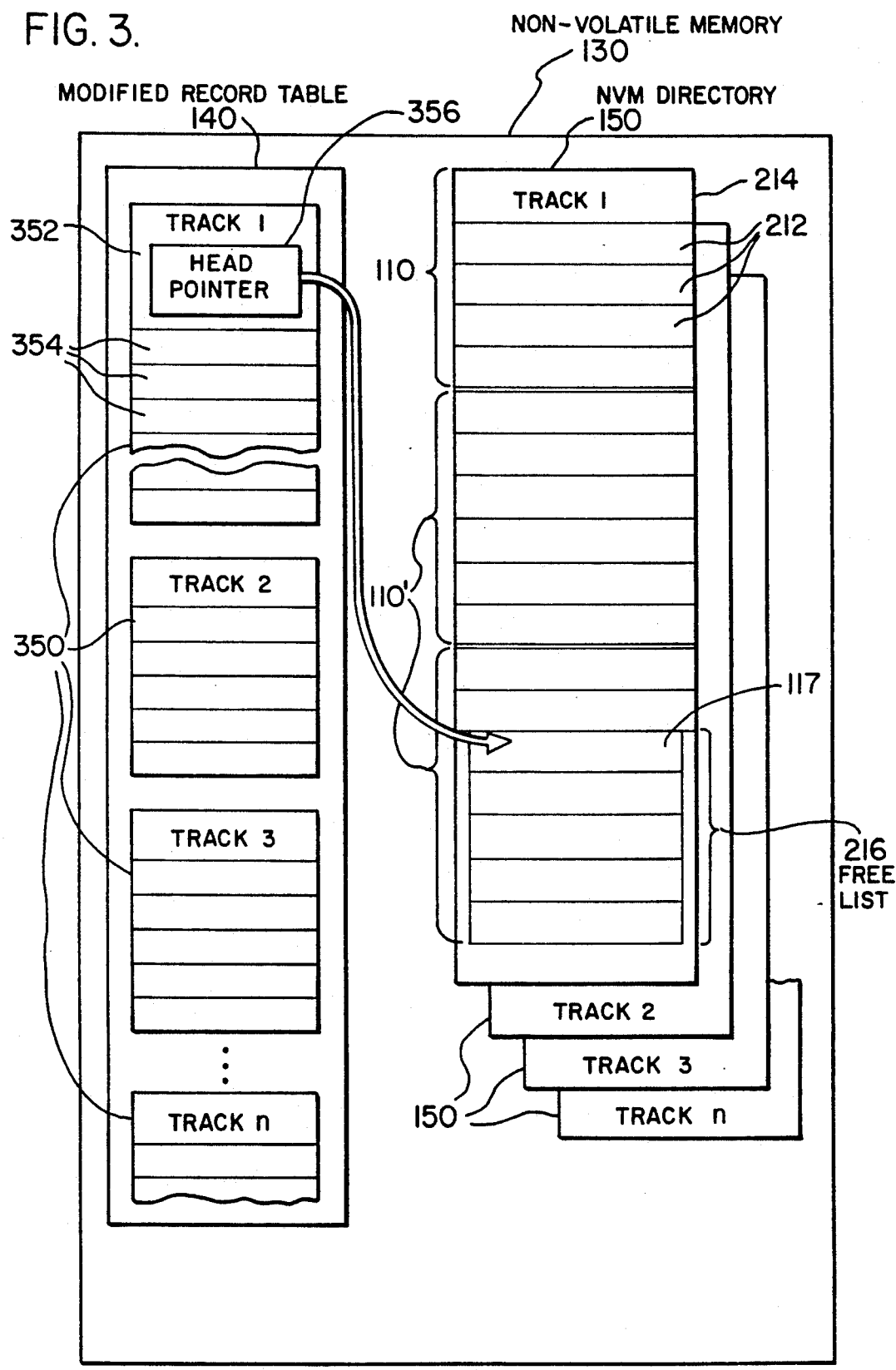
FIG. 3 shows the non-volatile memory subsystem containing a modified record table partitioned into a plurality of record descriptor lists, and containing a corresponding plurality of non-volatile memory directories.

FIG. 3 shows the non-volatile memory subsystem 130 also containing a modified record table 140 partitioned into a plurality of record descriptor lists 350, and containing a corresponding plurality of non-volatile memory directories 150. After a non-volatile memory directory 150 is allocated, an area in non-volatile memory 130, called a modified record table 140, is also allocated for storing indicia of location of record descriptors 212 that are later written to the non-volatile memory directory 150. Each time a track is read from the disk drive system 100, a record descriptor list 350 for that track is created in the modified record table 140. Each record descriptor list 350 is of sufficient size to accommodate 128 entries 354, which number of entries is typically the maximum possible number of records contained on one track of an individual disk in the disk drive system 100 (only several of the 128 entries are shown for purposes of clarity).

All free memory locations (those locations which are not occupied by record descriptors 212) in each non-volatile memory directory 150 are put into a free list 216 in the non-volatile memory directory 150 for the corresponding track. The free list 216 is used for storing new record descriptors 354 for the track. Each time a segment 210 or 210' is allocated, a counter, indicating the number of available record descriptors for the corresponding track, is incremented accordingly.

The free list 216 is a singly-linked list with the first available memory location 117 in the free list 216 being pointed to by a head pointer 356 located in the record descriptor list control area 352.

Data Record Writing to Non-Volatile Memory

Figure 4:
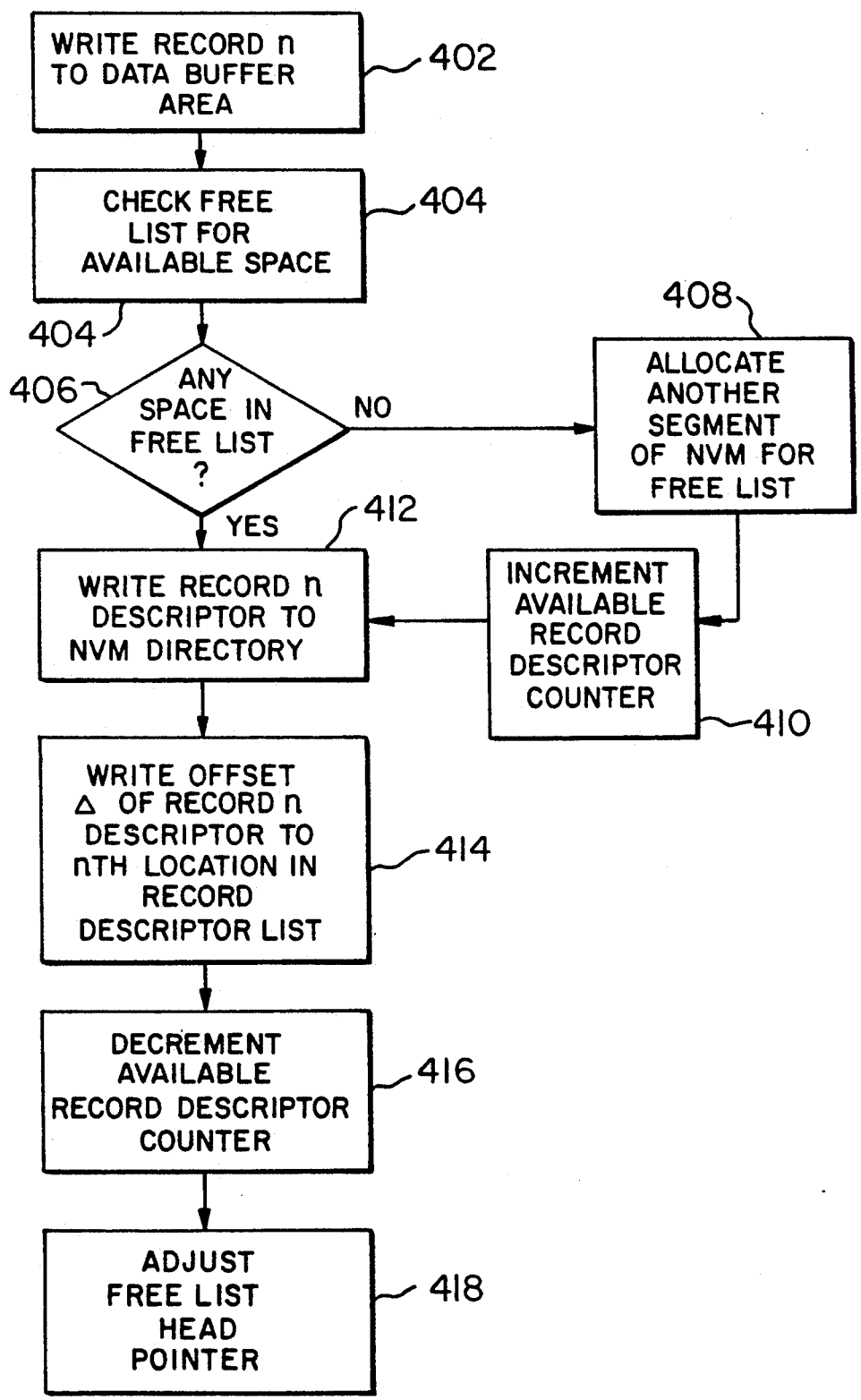
FIG. 4 is a flowchart showing the steps associated with the storing of a copy of a record in non-volatile memory.

FIG. 4 is a flowchart showing the steps associated with the storing of a copy 113' of record n in non-volatile memory 130 and FIG. 5 illustrates the position of data in non-volatile memory 130. When a disk record n on track m is updated as a result of a write operation, the following steps then occur:

(1) At step 402, a copy 113' of record n is written to a data buffer area 160 in non-volatile memory 130;

(2) the free list 216 for track m is checked at step 404 to determine whether there are any available record descriptors 212 in the non-volatile memory directory 150 for track m;

(3) if, at step 406, there is no space remaining in the free list 216 (i.e., there are no available record descriptors 212) for track m, then at step 408 another segment 210' of non-volatile memory is allocated to the free list 216, and the available record descriptor counter (not shown) is incremented by 32 at step 410;

(4) at step 412, a record descriptor 212' for record n is written to the first available location 504 in the free list 216 in the non-volatile memory directory 150;

(5) at step 414, the integer corresponding to the positional offset (rank) $\Delta$ of the record descriptor 212' from the beginning of the non-volatile memory directory 150 is then written to the nth location 502 in the record descriptor list 350' for track m in the modified record table 140;

(6) the available record descriptor counter in the free list 216 is decremented, at step 416; and (7) at step 418, the free list head pointer 352 is adjusted to point to the next entry in the free list 216.

Note that step (5) above accomplishes the ordering of the records for a given track in non-volatile memory 130.

Record Location in Non-Volatile Memory

FIG. 5 shows a record descriptor list 350' in the modified record table 140, an associated non-volatile memory directory 150, and the data buffer area 160. In order to locate a modified record 113', in non-volatile memory 130, with a record number n, on track number m, the record descriptor list 350' for track m is first located in the modified record table 140. The nth entry 502 in the record descriptor list 350' is then located. This nth entry 502 contains the offset Δ, into the non-volatile memory directory 150, of the entry 504 containing the record descriptor 212' for the record to be located. The offset Δ is the number of entries from the beginning of the non-volatile memory directory 150 to the location of the desired modified record descriptor 212'. The entries in the record descriptor list 350' and in the non-volatile memory directory 150 are directly located (directly addressed) using memory address arithmetic methods well known in the art. The modified record 113' is found by referring to the entry 504 in the non-volatile memory directory 150, which entry 504 contains the address of the record 113' in non-volatile memory 130.

It is to be expressly understood that the claimed invention is not to be limited to the description of the above disclosed preferred embodiment but encompasses other modifications and alterations within the scope and spirit of the inventive concept.

We claim:

1. In a disk drive system which stores data in a plurality of tracks contained therein, each of said tracks containing a plurality of data records, each of said data records having an associated record number, said disk drive system having an associated volatile memory subsystem and an associated non-volatile memory subsystem, both of which subsystems are external to said disk drive system, said non-volatile memory subsystem having random-access memory for storing a plurality of said data records and a plurality of record descriptors, each of said record descriptors comprising a pointer to one of said data records in said non-volatile memory subsystem, a method for managing said data records in said non-volatile memory subsystem, comprising the steps of:

(a) allocating, in response to a request for writing a data record to said disk drive system, space for said record descriptors from the list of free memory locations;

(b) writing, to said data buffer area, a copy of each said data record which has been modified in both said non-volatile memory subsystem and in said volatile memory subsystem after having been read into said volatile memory subsystem from said disk drive system;

(c) allocating a data buffer area in said non-volatile memory subsystem for storing said data records;

(d) tabulating, in said non-volatile memory subsystem, a list of free memory locations available for storing said record descriptors;

(e) compiling, in said non-volatile memory subsystem, a directory of each said data record which has been modified, each entry in said directory having indicia of location of a corresponding modified said data record in said non-volatile memory subsystem;

(f) compiling, in said non-volatile memory subsystem, a list for each of said tracks which has been read into said volatile memory subsystem from said disk drive system, each said list having entries, ordered sequentially by said record number, of the records in said non-volatile memory subsystem, each of said entries in said list having indicia of location of a corresponding said record descriptor in said directory of modified data records; and (g) locating said selected data record in the non-volatile memory subsystem, by indexing to the record descriptor in said list in said non-volatile memory subsystem, using the record number as an offset from the beginning of the list, to find an entry in the list, and then using the value of the found entry as an offset into said directory of modified data records to fine the entry having indicia of location of the selected data record in said non-volatile memory subsystem.

2. The method of claim 1 wherein the step of compiling each said is performed in said volatile memory subsystem, exclusive of said non-volatile memory subsystem.

3. The method of claim 1 wherein:

the step of compiling said directory of said data records includes:

allocating a segment of said non-volatile memory equivalent to the size occupied by the sum of a pre-determined plurality of said record descriptors.

4. The method of claim 1 wherein space for the record descriptors is allocated in segments capable of containing between 16 and 64 descriptors per segment.

5. The method of claim 4 wherein said segments are allocated only when additional space is required for storing additional record descriptors.

6. In a disk drive system which stores data in a plurality of tracks each containing a plurality of data records, each of said data records having an associated record number, said disk drive system having an associated non-volatile memory subsystem external to said disk drive system and having random-access memory for storing a plurality of said data records, said non-volatile memory subsystem containing a plurality of record descriptors, each said record descriptor comprising a pointer to one of said data records in said non-volatile memory subsystem, a method for managing said data records in said non-volatile memory subsystem comprising the steps of:

(a) allocating space for a table of modified records in said non-volatile memory subsystem having n entries, each entry being of sufficient size to contain indicia of location of a memory location in said non-volatile memory subsystem, where n is equal to the number of said data records per said track;

(b) allocating a segment of space for a non-volatile memory directory, capable of containing v said record descriptors, where v is a variable integral number between one and the number of said data records per said track, said segment being allocated from said free list;

(c) maintaining a free list, in said non-volatile memory subsystem, of the unused memory locations in the directory which are available for storing said record descriptors;

(d) defining an area in said non-volatile memory subsystem as a non-volatile memory data buffer for storing said data records which are modified;

(e) writing said data records to the non-volatile memory data buffer;

(f) storing, for each of said data records which has been modified in said non-volatile memory system as a result of a request for writing said data record to said disk drive system, in the first available location in the free list, a record descriptor corresponding to said modified data record, and in the mth location in the record descriptor list in the modified record table for the associated track, the integer corresponding to the offset, into the non-volatile memory directory, of the entry containing the record descriptor for said modified data record, where m is the record number of said modified record;

(g) compiling, in the table of modified records, for each said track, a list of said record descriptors for said records written to said non-volatile memory subsystem, said record descriptor list having entries sequentially ordered by record number, each said entry in said list having indicia of location of a record descriptor in said non-volatile memory directory, said record descriptor corresponding to one of said data records in said non-volatile memory data buffer; and (h) locating said selected data record in said non-volatile memory subsystem, using the record number of said selected data record as an offset from the beginning of said record descriptor list to an entry in said list, then using the integer value of said entry in said list as the rank of position of an entry in said non-volatile memory directory, said non-volatile memory directory entry having indicia of location of said selected record in said non-volatile memory subsystem.

7. The method of claim 6 wherein the step of allocating a segment of space for the non-volatile memory directory occurs in response to a request for writing a data record to said disk drive system, when said request requires more space than currently allocated in the free list for the track associated with the record; and v is an integer between 8 and 64.

* * * * *